United States Patent
Foucart et al.

(10) Patent No.: US 7,397,391 B2
(45) Date of Patent: Jul. 8, 2008

(54) METHOD AND SYSTEM FOR AIDING THE PILOTING OF AN AIRCRAFT, DURING A MANEUVER BRINGING ABOUT AN INCREASE IN THE ATTITUDE OF THE AIRCRAFT

(75) Inventors: Vincent Foucart, Ramonville Saint Agne (FR); Eric Albert, Pamiers (FR); Simon Innocent, Toulouse (FR)

(73) Assignee: Airbus France, Toulouse (FR)

( * ) Notice: Subject to any disclaimer, the term of this patent is extended or adjusted under 35 U.S.C. 154(b) by 161 days.

(21) Appl. No.: 11/385,889

(22) Filed: Mar. 22, 2006

(65) Prior Publication Data

US 2006/0220921 A1    Oct. 5, 2006

(30) Foreign Application Priority Data

Mar. 24, 2005    (FR)    ..................... 05 02925

(51) Int. Cl.
*G01C 23/00* (2006.01)
(52) U.S. Cl. .................. 340/975; 340/967; 701/14
(58) Field of Classification Search .................. 340/945, 340/959, 963, 966, 980 X, 967, 971, 974, 340/975 X; 701/4, 8, 9, 14, 15
See application file for complete search history.

(56) References Cited

U.S. PATENT DOCUMENTS

| | | | | |
|---|---|---|---|---|
| 4,786,905 | A | * | 11/1988 | Muller ........................ 340/975 |
| 5,675,328 | A | | 10/1997 | Coirier et al. |
| 6,121,899 | A | | 9/2000 | Theriault |
| 6,469,640 | B2 | * | 10/2002 | Wyatt .......................... 340/975 |

FOREIGN PATENT DOCUMENTS

EP    0037449    10/1981

* cited by examiner

*Primary Examiner*—Brent Swarthtout
(74) *Attorney, Agent, or Firm*—Dickinson Wright, PLLC

(57) ABSTRACT

A method of aiding the piloting of an aircraft during a maneuver, bringing about an increase in the attitude of the aircraft, is carried out automatically and repeatedly. According to the method, an attitude deviation is determined by subtracting a first value of attitude from a determined current attitude of the aircraft. A horizon line is presented on a display screen of a head-up display device, superimposed with the environment seen in front of the aircraft, as is an indication of the attitude deviation. The first value of attitude corresponds to the minimum value of (1) an optimal value of attitude at the end of the maneuver and (2) a value of attitude of protection against a rear collision.

11 Claims, 1 Drawing Sheet

METHOD AND SYSTEM FOR AIDING THE PILOTING OF AN AIRCRAFT, DURING A MANEUVER BRINGING ABOUT AN INCREASE IN THE ATTITUDE OF THE AIRCRAFT

FIELD OF THE INVENTION

The present invention relates to a method and a system for aiding the piloting of an aircraft, during a maneuver bringing about an increase in the attitude of the aircraft, for example during a rotation.

BACKGROUND OF THE RELATED ART

Within the framework of the present invention, rotation is understood to mean a maneuver of the aircraft, in particular of a transport aircraft, which brings about an increase in the angle of attitude during a takeoff phase. The present invention may also be applied to the following maneuvers: a go-around in the course of an approach phase or a flare-out during a landing phase.

It is known that such a system for aiding piloting can comprise:
- a set of information sources, including an information source which determines a current attitude of the aircraft;
- a calculation unit which is connected to said set of information sources; and
- a head-up display device of HUD type which is connected to said calculation unit and which is able to present, on a display screen, superimposed with the environment seen in front of the aircraft, at least one attitude scale and a means of indication (aircraft reference) associated with said attitude scale and indicating said current attitude of the aircraft.

It is known to present, moreover, on said display screen, a marker generally situated between +10° and +15° on the attitude scale, that the pilot will align with said aircraft reference so as to obtain, for example in the case of a rotation, the desired attitude at the end of rotation. This known way of providing information to the pilot has several drawbacks. In particular:
- the zone of the corresponding attitude scale being situated outside the field of display when the aircraft exhibits a zero attitude, the pilot does not see said marker at the moment of the initiation of the rotation. This often induces an overshoot of the desired value of attitude, by reason of too fast a subsequent appearance of said marker in the field of display of the display screen;
- the pilot is compelled to look at the top part of the display field so as to monitor the appearance of said marker, and this may cause him to neglect the holding of the trajectory of the aircraft on the center of the runway; and
- the visual scan is hardly optimal. Specifically, the pilot first looks downward during rolling, then upward during the rotation, then again downward after the rotation (since he uses the speed vector and the guidance associated therewith during the initial climb).

SUMMARY OF THE INVENTION

The present invention relates to a method making it possible to remedy the aforesaid drawbacks.

For this purpose, according to the invention, said method is noteworthy in that the following steps are carried out automatically and repeatedly:

a) a first value of attitude of the aircraft is taken into account;
b) the current attitude of the aircraft is determined;
c) an attitude deviation is determined by subtracting said first value of attitude from said current attitude; and
d) at least one horizon line and a first means of indication which indicates said attitude deviation are presented on a display screen of a head-up display device, superimposed with the environment seen in front of the aircraft.

Thus, by virtue of its mode of determination, and as specified hereinbelow, said first means of indication is presented under said horizon line, that is to say in the zone (at the bottom) where the pilot's gaze normally falls when managing the lateral control of the aircraft.

Preferably, said first means of indication is presented on an attitude scale, on which is also presented a second means of indication indicating said current attitude of the aircraft.

In a first embodiment, said first value of attitude corresponds to an optimal value of attitude at the end of the maneuver, for example at the end of the rotation. Thus, in order for the aircraft to exhibit at the end of the maneuver said prescribed optimal value of attitude, it suffices to make said first means of indication (indicating said optimal value of attitude) and said horizon line correspond. Furthermore, advantageously, in step d), a symbol of protection against a rear collision (or "tailstrike") is moreover presented on the display screen.

In a second embodiment, said first value of attitude corresponds to the minimum value between, on the one hand, an optimal value of attitude at the end of the maneuver (which is in general constant) and, on the other hand, a value of attitude of protection against a rear collision (which is in general variable). Within the framework of the present invention, rear collision is understood to mean the collision of the tail of the aircraft with the ground when the attitude of the aircraft reaches too large a value.

Thus, this second embodiment integrates a rear collision prevention function, as specified hereinbelow.

Preferably, during a phase of takeoff of the aircraft, said minimum value corresponds:
- to said value of attitude of protection, which is constant, when the aircraft is rolling on the ground;
- to said value of attitude of protection, which becomes variable and increasing, when the main landing gear of the aircraft leaves the ground, doing so until this value of attitude of protection becomes equal to said optimal value of attitude; and
- to said optimal value of attitude thereafter.

Furthermore, in a particular variant embodiment applied to the aforesaid first embodiment, said first means of indication is presented on said display screen at a fixed position and said horizon line is presented on said display screen in a moveable manner. Thus, the pilot must bring said moveable horizon line (by increasing the attitude of the aircraft) onto said first fixed means of indication, so as to perform the maneuver in such a way as to obtain said optimal value of attitude at the end of the maneuver.

The present invention makes it possible to solve the aforesaid various problems. Specifically:
- said first means of indication remains permanently in the field of display of the display screen, thereby enabling the pilot to anticipate the stoppage of the attitude increase;
- said first means of indication is displayed in the zone (on the runway, hence under the horizon line) where the pilot's gaze naturally falls when managing the lateral control of the aircraft; and monitoring is convenient and continuous, since the speed vector (that the pilot follows during the initial climb) emerges from the horizon.

Furthermore, as indicated previously, by virtue of the taking into account in the second aforesaid embodiment of said value of attitude protection, (in the definition of said first means of indication), a rear collision prevention function is moreover obtained.

The present invention also relates to a system for aiding piloting for an aircraft, said system comprising:
 a set of information sources, comprising at least one information source which determines a current attitude of the aircraft;
 a calculation unit which is connected to said set of information sources; and
 a head-up display device, which is connected to said calculation unit and which is able to present, on a display screen, superimposed with the environment seen in front of the aircraft, at least one horizon line.

According to the invention:
 said system furthermore comprises:
  a first means for transmitting a first value of attitude; and
  a second means for determining an attitude deviation, by subtracting said first value of attitude from said current attitude; and
 said display device moreover presents on said display screen, superimposed with the environment seen in front of the aircraft, at least one first means of indication indicating said attitude deviation.

Advantageously, said display device is formed in such a way as to moreover present, on said display screen, an attitude scale and a second means of indication which is associated with said attitude scale and which indicates the current attitude of the aircraft.

In a particular embodiment, said system furthermore comprises a means of input making it possible for an operator to input (into said system) at least one value liable to be transmitted as first value of attitude, and in particular said optimal value of attitude.

Furthermore, in a preferred embodiment making it possible to prevent any risk of rear collision, said first means is formed so as to (determine and) transmit to the second means, as first value of attitude, the minimum value between, on the one hand, an optimal value of attitude at the end of the maneuver (for example at the end of the rotation) and, on the other hand, a value of attitude of protection against a rear collision.

The figures of the appended drawing will elucidate the manner in which the invention may be embodied. In these figures, identical references designate similar elements.

DETAILED DESCRIPTION OF THE INVENTION

Figure 1:
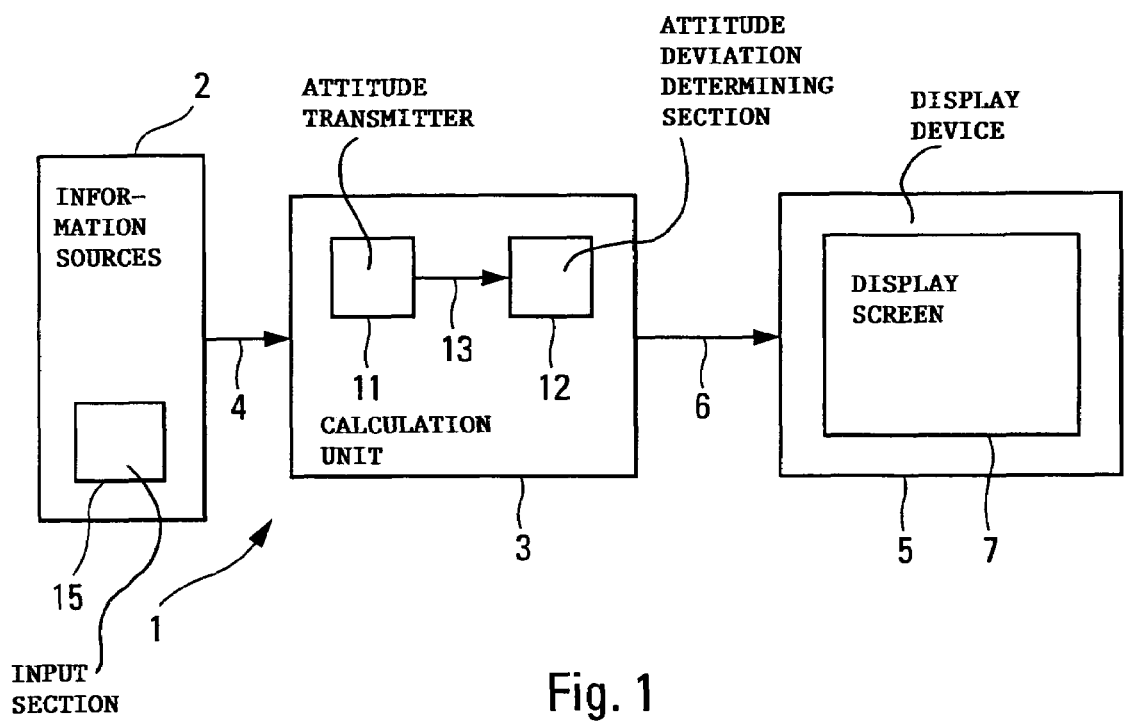
FIG. 1 is the schematic diagram of a system for aiding piloting in accordance with the invention.

The system 1 in accordance with the invention and represented diagrammatically in FIG. 1 is intended to aid a pilot of an aircraft, in particular a transport aircraft, to pilot said aircraft during a maneuver of the aircraft bringing about an increase in the angle of attitude, in particular in the course of a rotation during a takeoff phase or else during a go-around or a flare-out during a landing phase.

Figure 2:
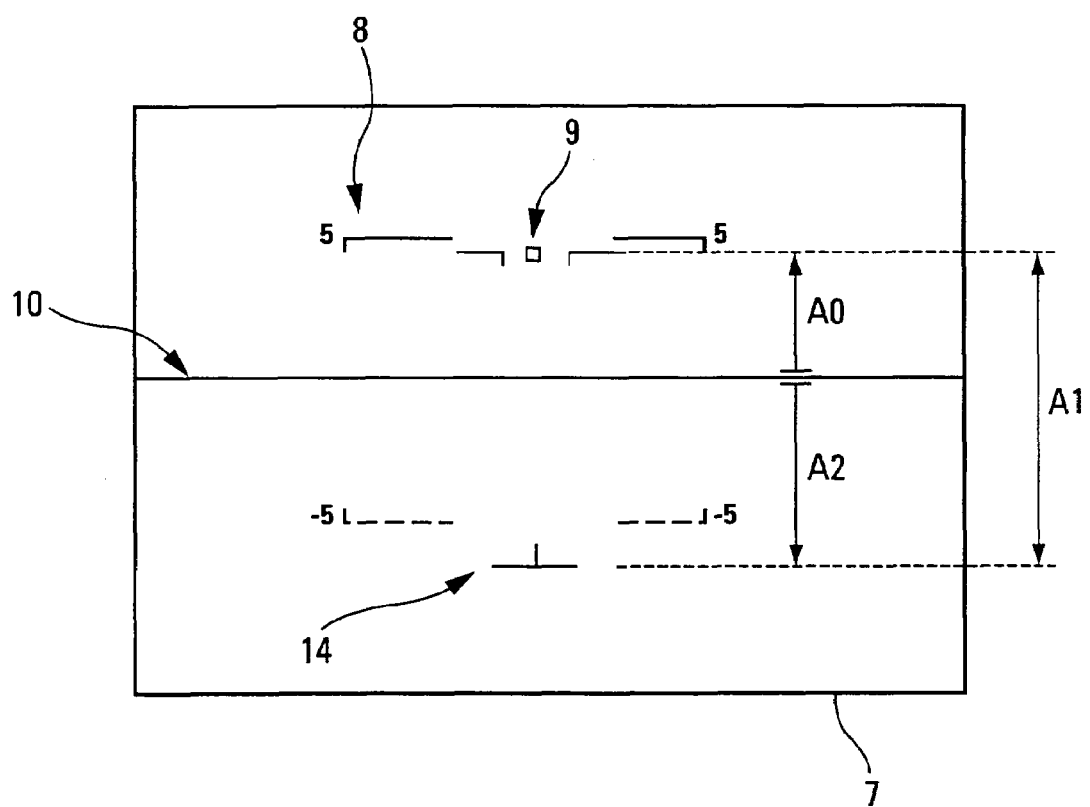
FIG. 2 illustrates a display that can be implemented by a system for aiding piloting in accordance with the invention.

To do this, said system 1 is of the type comprising:
 a set 2 of information sources, comprising in particular an information source which determines in standard fashion a current attitude of the aircraft (not represented);
 a calculation unit 3 which is connected by a link 4 to said set 2 of information sources; and
 a head-up display device 5 of HUD type which is connected to said calculation unit 3 by a link 6 and which is able to present, on a standard transparent display screen 7, superimposed with the environment seen in front of the aircraft, at least one horizon line 10 and possibly a standard attitude scale 8, as well as at least one standard means of indication 9 which indicates the current attitude of the aircraft on said attitude scale 8, as represented in FIG. 2.

The aircraft exhibits a current attitude of value AO, namely nearly five degrees for the example represented in FIG. 2.

Furthermore, according to the invention:
 said system 1 furthermore comprises:
  a means 11 for transmitting a first value of attitude A1; and
  a means 12 connected by a link 13 to said means 11 for determining an attitude deviation A2, by subtracting said first value of attitude A1 from said current attitude A0 (that is to say A2=A0−A1); and
 said display device 5 presents, moreover, on said display screen 7, superimposed with the environment seen in front of the aircraft, a means of indication 14 which indicates said attitude deviation A2 on said attitude scale 8.

In a preferred embodiment represented in FIG. 1, said means 11 and 12 are integrated into the central unit 3.

In a first particular embodiment, said first value of attitude A1 corresponds to an optimal value of attitude at the end of the maneuver, for example at the end of the rotation. It will be noted that the optimal value of attitude to be reached at the end of the maneuver depends on the aircraft and possibly even on the conditions on the day. By way of illustration, it may be 12.5° or 15°, at the end of the rotation, for a slow and heavy tactical transport aircraft. Thus, in order for the aircraft to exhibit at the end of the maneuver said prescribed optimal value of attitude A1, it suffices to make said means of indication 14 (indicating said attitude deviation A2) and said horizon line 10 correspond in such a way that at the end of the rotation, the current attitude A0 of the aircraft is equal to said value A1.

In this case, said means of indication 14 presents a fixed position on the display screen 7 under said means of indication 9, at a distance (value of attitude A1) corresponding to the attitude to be reached at the end of the rotation. The pilot must therefore bring the means of indication 14 onto the horizon line 10 during the maneuver. For this purpose, said means of indication 14 being fixed, the horizon line 10 which is moveable descends into the field of display of the display screen 7 when the pilot increases in standard fashion the attitude of the aircraft.

In a preferred variant embodiment applied to said first embodiment:
 said calculation unit 3 determines a safety margin A3 with respect to a rear collision, that is to say with respect to a collision of the tail of the aircraft with the ground when the attitude of the aircraft reaches too large a value. This safety margin A3 is equal to the difference between a protection attitude A4 and the current attitude A0; and
 said display device 5 moreover presents on the display screen 7 a corresponding protection symbol (not represented) illustrated for example by a horizontal segment.

This symbol of protection against a rear collision is moveable and is presented above said means of indication 14 which is fixed, at a distance representative of said safety margin A3.

In the course of a rotation, the pilot brings the moveable horizon line 10 onto the fixed means of indication 14, taking care to keep this means of indication 14 under said protection symbol, so as to avoid a rear collision ("tailstrike").

By way of example, during a phase of takeoff of the aircraft, chronologically, said symbol of protection against a rear collision:

is initially fixed;

then descends with the horizon line 10 toward the means of indication 14 at the moment of the rotation (since the current attitude A0 increases progressively). The pilot takes care to see that the means of indication 14 never passes above said protection symbol, so as to avoid a rear collision; and just after takeoff, climbs back up progressively toward the horizon line 10 until it passes above, since the angle of collision and thus the value of attitude of protection A4 which depends thereon are increasing. The pilot can henceforth bring the protection symbol 14 to the horizon, thereby bringing the aircraft to the optimal attitude A1.

In a second particular embodiment, said first value of attitude A1 corresponds to the minimum value between, on the one hand, an optimal value of attitude at the end of the rotation (as specified above) and, on the other hand, value of attitude of protection against a rear collision, that is to say for protection against a collision of the tail of the aircraft with the ground when the attitude of the aircraft reaches too large a value.

Thus, this second embodiment directly integrates a rear collision prevention function, as specified hereinbelow.

The value of attitude of protection is dependent, preferably, on an angle of collision which depends in particular on the height with respect to the ground of the aircraft and:

which is minimal and constant, when the aircraft is on the ground; and which increases progressively after takeoff (instant at which the main landing gear of the aircraft leaves the ground), until the risk of rear collision no longer exists.

The value of this angle of collision (which corresponds to the angle of attitude for which the aircraft touches the ground with its tail) and the value of attitude of protection (which is preferably a few degrees less than said angle of collision) vary as a function of the height and of the attitude of the aircraft.

The set 2 of information sources comprises means which provide the actual height and the actual trim of the aircraft. In a first embodiment, this information (height and trim) are provided to the means 11 which calculates said protection value of attitude, while, in a second embodiment, this information is provided to a means of calculation which also forms part of said set 2 of information sources and which is formed so as to calculate said value of attitude of protection and transmit it to said means 11.

Said means 11 also determines the minimum value (between said protection value of attitude and the optimal value of attitude), which minimum value is transmitted to said means 12.

Preferably, during a phase of takeoff of the aircraft, said minimum value corresponds:

to said value of attitude of protection, which is constant, when the aircraft is rolling on the ground;

to said value of attitude of protection, which becomes variable and increasing, when the main landing gear of the aircraft leaves the ground, doing so until this protection value of attitude becomes equal to said optimal value of attitude; and to said optimal value of attitude thereafter.

The system 1 in accordance with the invention furthermore comprises a means of input 15, for example a keyboard, allowing an operator to input into said system 1 at least one value which is used by said central unit 3 (and in particular by said means 11), and in particular said optimal value of attitude.

With this second embodiment, the pilot must therefore bring said horizon line 10 (by increasing the attitude of the aircraft) onto said means of indication 14, so as to perform the rotation, in such a way as to obtain said optimal value of attitude at the end of the rotation. In this case, said means of indication 14 is only fixed before takeoff. Moreover, to do this, it is necessary to take care to see that said horizon line 10 never passes under said means of indication 14, so as to avoid the current attitude A0 of the aircraft overshooting said value of attitude of protection A1, and thus to prevent any rear collision.

Thus, for example, for an aircraft for which the optimum value of attitude at the end of the rotation is 15°, and for which the protection value of attitude is initially 11°:

the symbol for aiding rotation (means of indication 14) is initially displayed 11° under the aircraft reference (means of indication 9);

the pilot increases the attitude during the rotation, this having the effect of making the horizon line 10 which is moveable approach said symbol for aiding rotation (means of indication 14) which is fixed before takeoff. The pilot takes care to see that the horizon line 10 never passes under said symbol for aiding rotation (means of indication 14) so as to avoid a rear collision;

just after takeoff, the angle of collision and hence the value of attitude of protection which depends thereon increase progressively, and the symbol for aiding rotation (means of indication 14) descends henceforth progressively from the position at 11° under the aircraft reference (means of indication 9) to a position at 15° under the aircraft reference (means of indication 9) where it stops;

the pilot continues to make the means of indication 14 approach the horizon line 10, thereby bringing the aircraft to the optimal attitude of 15°.

By reason of the standard rotation speeds (rate of increase of the attitude) and of the standard values of attitude during takeoff, the sequence described hereinabove runs in a continuous manner for the pilot who maintains a quasi-continuous rate of rotation throughout the rotation maneuver. The symbol for aiding rotation (means of indication 14) therefore provides the pilot with:

a reference which aids him in perceiving his speed of rotation while continuing to look at the runway (situated at the bottom of the field of display of the display screen 7);

protection against a rear collision; and a target value making it possible to reach the optimal attitude at the end of the rotation.

The invention claimed is:

1. A method of aiding the piloting of an aircraft during a maneuver bringing about an increase in the attitude of the aircraft, according to which method the following steps are carried out automatically and repeatedly:

a) a first value of attitude of the aircraft is taken into account;

b) the current attitude of the aircraft is determined;

c) an attitude deviation is determined by subtracting said first value of attitude from said current attitude; and d) at least one horizon line is presented on a display screen of a head-up display device, superimposed with the environment seen in front of the aircraft, wherein:

in step d), a first section of indication which indicates said attitude deviation is moreover presented on said display screen, said first value of attitude corresponds to an optimal value of attitude at the end of the maneuver, and said first section of indication is presented on said display screen at a fixed position and said horizon line is presented on said display screen in a moveable manner.

2. The method as claimed in claim 1, wherein said first section of indication is presented on an attitude scale, on which is also presented a second section of indication indicating said current attitude of the aircraft.

3. The method as claimed in claim 1, wherein in step d), a symbol of protection against a rear collision is moreover presented on the display screen.

4. An aircraft, which comprises a system able to implement the method specified under claim 1.

5. A method of aiding the piloting of an aircraft during a maneuver bringing about an increase in the attitude of the aircraft, according to which method the following steps are carried out automatically and repeatedly:

a) a first value of attitude of the aircraft is taken into account;

b) the current attitude of the aircraft is determined;

c) an attitude deviation is determined by subtracting said first value of attitude from said current attitude; and d) at least one horizon line is presented on a display screen of a head-up display device, superimposed with the environment seen in front of the aircraft, wherein:

in step d), a first section of indication which indicates said attitude deviation is moreover presented on said display screen, and said first value of attitude corresponds to the minimum value between, on the one hand, an optimal value of attitude at the end of the maneuver and, on the other hand, a value of attitude of protection against a rear collision.

6. The method as claimed in claim 5, wherein said first section of indication is presented on an attitude scale, on which is also presented a second section of indication indicating said current attitude of the aircraft.

7. The method as claimed in claim 5, wherein, during a phase of takeoff of the aircraft, said minimum value corresponds:

to said value of attitude of protection, which is constant, when the aircraft is rolling on the ground;

to said value of attitude of protection, which becomes variable and increasing, when the main landing gear of the aircraft leaves the ground, doing so until this value of attitude of protection becomes equal to the optimal value of attitude; and to said optimal value of attitude thereafter.

8. A system for aiding piloting for an aircraft, said system comprising:

a set of information sources, comprising at least one information source which determines a current attitude of the aircraft;

a first section that transmits a first value of attitude;

a second section that determines an attitude deviation, by subtracting said first value of attitude from said current attitude;

a calculation unit which is connected to said set of information sources; and a head-up display device, which is connected to said calculation unit and which is able to present, on a display screen, superimposed with the environment seen in front of the aircraft, at least one horizon line, wherein:

said display device moreover presents on said display screen, superimposed with the environment seen in front of the aircraft, at least one first section of indication indicating said attitude deviation determined by said second section, and said first section is formed so as to transmit, as the first value of attitude, the minimum value between, on the one hand, an optimal value of attitude at the end of the maneuver and, on the other hand, a value of attitude of protection against a rear collision.

9. The system as claimed in claim 8, wherein said display device is formed in such a way as to moreover present, on said display screen, an attitude scale and a second section of indication which is associated with said attitude scale and which indicates the current attitude of the aircraft.

10. The system as claimed in claim 8, wherein it furthermore comprises a section of input making it possible for an operator to input at least one value corresponding to said optimal value of attitude.

11. An aircraft, which comprises a system such as that specified under claim 8.

* * * * *